United States Patent [19]
Hokkanen et al.

[11] Patent Number: 6,143,844
[45] Date of Patent: Nov. 7, 2000

[54] CATALYST FOR OLEFIN POLYMERIZATION AND A METHOD FOR THE MANUFACTURE THEREOF

[75] Inventors: Harri Hokkanen, Helsinki; Hilkka Knuuttila, Porvoo; Eeva-Liisa Lakomaa, Espoo, all of Finland; Pekka Sormunen, Charlottenlund, Denmark

[73] Assignee: Borealis A/S, Lyngby, Denmark

[21] Appl. No.: 09/058,806

[22] Filed: Apr. 13, 1998

Related U.S. Application Data

[62] Division of application No. 08/905,799, Aug. 12, 1997, Pat. No. 5,767,032, which is a continuation of application No. 08/689,132, Jul. 30, 1996, abandoned, which is a continuation of application No. 08/352,207, Dec. 2, 1994, abandoned.

[30] Foreign Application Priority Data

Dec. 3, 1993 [FI] Finland ..................... 935417

[51] Int. Cl.[7] ........................................ C08F 4/44
[52] U.S. Cl. .................. 526/114; 526/119; 526/127; 526/130; 526/160; 526/907; 526/943
[58] Field of Search ...................... 526/127, 130, 526/160, 907, 943, 114, 119; 502/104, 106, 108, 113

[56] References Cited

U.S. PATENT DOCUMENTS

| | | |
|---|---|---|
| 4,150,343 | 4/1979 | Seelig et al. . |
| 4,193,835 | 3/1980 | Inoue . |
| 4,701,432 | 10/1987 | Welborn, Jr. . |
| 4,935,474 | 6/1990 | Ewen et al. . |
| 5,032,562 | 7/1991 | Lo et al. . |
| 5,281,679 | 1/1994 | Jejelowo et al. . |
| 5,317,036 | 5/1994 | Brady, III et al. . |
| 5,374,700 | 12/1994 | Tsutsui et al. . |
| 5,789,332 | 8/1998 | Kutschera et al. ............... 502/106 |

FOREIGN PATENT DOCUMENTS

| | | |
|---|---|---|
| 279863 | 8/1988 | European Pat. Off. . |
| 91/10510 | 7/1991 | WIPO . |
| 9110510 | 7/1991 | WIPO . |
| WO9110510 | 7/1991 | WIPO . |
| WO9302111 | 4/1993 | WIPO . |

OTHER PUBLICATIONS

Chemical Abstracts, vol. 115, No. 26, Abstract 115:257990z; 1991.

*Primary Examiner*—David W. Wu
*Assistant Examiner*—Roberto Rabago
*Attorney, Agent, or Firm*—Birch, Stewart, Kolasch & Birch, LLP

[57] ABSTRACT

Provided are heterogeneous catalysts for homo- and copolymerization of olefins as well as a method for preparing these catalysts, which comprise at least one metallocene compound of a Group 4A, 5A or 6A (Hubbard) transition metal on a solid inorganic support. The method comprises the steps of vaporizing the metallocene compound, treating the support material with the vaporized metallocene compound at a temperature which is sufficiently high to keep the metallocene compound in the vaporous state, contacting the support material with an amount of the vaporized metallocene compound which is sufficient to allow for a reaction between the metallocene compound and at least a substantial part of the available surface sites capable of reacting therewith, removing the rest of the metallocene compound not bound to the support, and optionally treating the product thus obtained with an activating agent. The catalysts are active even if very low amounts of activator agents, such as alumoxane, are used. Furthermore, the polymerization performance of the catalysts can be regulated during the preparation of the catalysts. Thus, by using different support pretreatment temperatures, or by using two or more different metallocenes, and by altering the order in which they are added on the support, it is possible to control and regulate the activity of the catalysts and the polymer properties, such as molecular weight and molecular weight distribution.

23 Claims, No Drawings

CATALYST FOR OLEFIN POLYMERIZATION AND A METHOD FOR THE MANUFACTURE THEREOF

This application is a divisional application of Ser. No. 08/905,799, filed Aug. 12, 1997, now U.S. Pat. No. 5,767,032, which is a continuation application of Ser. No. 08/689,132 filed Jul. 30, 1996, now abandoned, which is a continuation application of Ser. No. 08/352,207, filed Dec. 2, 1994, now abandoned, the entire contents of each of these applications are hereby incorporated by reference.

BACKGROUND OF THE INVENTION

1. Field of the invention

The present invention relates to novel supported catalysts for polymerizing ethylene and olefins having 3 or more carbon atoms, such as propylene, 1-butene, 1-pentene, 1-hexene and 1-octene. In particular, the present invention concerns a new method for manufacturing catalysts comprising at least one metallocene compound of a Group 4A, 5A or 6A transition metal on an inorganic oxidic support material, such as silica or alumina. The present invention also relates to catalysts prepared by said method, and to a process for polymerizing ethylene or other 1-olefins or mixtures thereof by using said catalysts.

2. Description of Related Art

Typical prior art catalysts for olefin polymerization are represented by the Ziegler-type catalysts, which contain mixtures of transition metal compounds and aluminum alkyl compounds on a suitable support, such as silica. The transition metal compounds of the Ziegler-catalysts are often comprised of titanium or vanadium compounds. Recently a new class of catalyst systems containing metallocene compounds of transition metals have been developed. In comparison to traditional Ziegler-catalysts, the metallocene catalysts have several advantages, in particular as regards their catalytic activity. Thus, especially catalysts comprising the reaction product of a cyclopentadienyl-transition metal compound and alumoxane have very high activities in polymerization of ethylene or other 1-olefins.

There are, however, some problems associated with the metallocene catalysts, as well. The metallocene catalysts were first developed for use as homogeneous systems, which have the disadvantage that they cannot be employed for polymerizations in the slurry or gas phase. Another disadvantage of the homogeneous systems resides in the fact that high activities can only be achieved by using very high amounts of alumoxane, thereby producing polymers with high aluminum content. More recently, supported systems have also been developed. These heterogeneous catalysts can be used both in slurry and gas phase polymerizations. For example, in EP 206.794 there are disclosed metallocene catalysts, which are prepared from the reaction product of a metallocene compound with alumoxane in the presence of an inorganic support material, such as silica, the main object being to decrease the amount of alumoxane used. However, the disclosure of said patent application shows that the use of lower alumoxane content in the catalysts leads to extremely low catalyst activities. Magnesium dichloride has also been used as support material for metallocene catalysts (see, e.g., EP 436 326).

All prior art methods for manufacturing metallocene catalysts comprise depositing the metallocene compound and the other components on the support from solutions or suspensions. This is disadvantageous because catalytically inactive compounds are introduced into the catalysts during the preparation process. These compounds have to be removed afterwards. The use of hydrocarbon solvents gives rise to environmental problems, and purification and recirculation of the solvents causes additional costs. Furthermore, it is difficult to prepare catalysts which have complicated structures.

Therefore, in view of the prior art, there exists a need for methods of preparing metallocene catalysts which do not resort to using solvents or other components which have to be removed from the finished catalyst systems. In addition, there exists a need for heterogeneous, high-activity metallocene catalysts which do not contain large amounts of activators, such as alumoxane, and which provide means for regulating the molecular weight and the molecular weight distribution of the polymers obtained.

SUMMARY OF THE INVENTION

It is an object of the present invention to eliminate the above-mentioned problems and to provide an entirely novel method for manufacturing heterogeneous metallocene catalysts for polymerization or copolymerization of ethylene or other 1-olefins having 3 or more carbon atoms such as propylene, 1-butene, 1-pentene, 1-hexene and 1-octene.

In particular, it is an object of the present invention to provide a new method for manufacturing catalysts comprising the reaction product between a metallocene-transition metal compound and an inorganic oxidic support material, such as silica or alumina, the activity of the catalyst being reasonably high without excessive use of activators such as alumoxane.

It is a further object of the present invention to provide a method for polymerizing ethylene or other 1-olefins or mixtures thereof using said catalysts as well as to provide products prepared by these catalysts.

According to the present invention, the above objects are achieved by a method for preparing heterogeneous catalysts for homo- and copolymerization of olefins, said catalysts comprising at least one metallocene compound of a Group 4A, 5A or 6A (Hubbard) metal on a solid inorganic support, said support material being treated with said metallocene compound under conditions wherein the temperature is sufficiently high to cause said metallocene compound to be in the vapor state, and wherein the amount of the metallocene compound is sufficient to allow for a reaction with at least a substantial part of the available surface sites which are capable of reacting with said metallocene compound. The rest of the metallocene compound not bound to the support is removed, preferably in the vapour state. Preferably, the catalysts thus prepared can be used in the presence of an activating agent for polymerizing or copolymerizing olefins in the liquid or gas phase.

In particular, the method according to the present invention for preparing said catalyst comprises the steps of:
 vaporizing the metallocene compound,
 treating said support material with the vaporized metallocene compound at a temperature which is sufficiently high to keep said metallocene compound in the vaporous state,
 contacting said support material with an amount of said vaporized metallocene compound which is sufficient to allow for a reaction between the metallocene compound and at least a substantial part of the available surface sites capable of reacting therewith,
 removing the rest of the metallocene compound not bound to the support, and optionally treating the product thus obtained with an activating agent.

Based on the above, the novel catalysts according to the present invention, which can be used for homo- or copolymerization of 1-olefins, have been prepared by chemisorbing in a reaction chamber a vaporized metallocene compound or a precursor thereof onto an inorganic support at a temperature which is sufficiently high to keep said metallocene compound in the vapour state during the reaction, and removing any unreacted metallocene compound in the vapour state so as to form a heterogeneous metallocene catalyst in the reaction chamber.

DETAILED DESCRIPTION OF THE INVENTION

The entire contents of each of the references cited herein are herein incorporated by reference. As mentioned above, according to the present invention, in order to prepare a heterogeneous metallocene catalyst, a suitable inorganic oxidic catalyst support is treated and reacted with a metallocene compound of a Group 4A, 5A or 6A (Hubbard) transition metal, said metallocene compound being in the vapor state during the reaction. The metallocene compound used in the method may comprise any metallocene compound, which can be vaporized at a moderate temperature, such as a temperature in the range from 50 to 500° C. Suitable metallocene compounds are represented by the following general formulas (I) to (III):

$$(Cp)_m MR_n X_q \qquad \text{I}$$

wherein the moiety (Cp) represents an unsubstituted or substituted and/or fused homo or heterocyclopentadienyl, M represents a transition metal of group 4A, 5A or 6A (Hubbard), R represents a hydrocarbyl or hydrocarboxy group having 1 to 20 carbon atoms, X represents a halogen atom, m is an integer from 1 to 3, n is an integer from 0 to 3, q is an integer from 0 to 3, and the sum of m+n+q corresponds to the oxidation state of M;

$$(CpR'_k)_g R''_s (CpR'_k) MQ_{3-q} \qquad \text{II}$$

and $$R''_s (CpR'_k)_2 MQ' \qquad \text{III}$$

wherein $(CpR'_k)$ is an unsubstituted or substituted and/or fused homo- or heterocyclopentadienyl, each R' is the same or different and is selected from the group consisting of hydrogen and hydrocarbyl radicals, such as alkyl, alkenyl, aryl, alkylaryl or arylalkyl radicals containing 1 to 20 carbon atoms, or in which two carbon atoms are attached to form a $C_4$–$C_6$ ring, R" is a $C_1$–$C_4$ alkylene radical, dialkylgermanium or silicon alkylphosphine or amine radical, or a group of 1–8 atoms bridging two $(CpR'_k)$ rings, Q is a hydrocarbyl radical, such as an aryl, alkyl, alkenyl, alkylaryl or arylalkyl radical containing 1 to 20 carbon atoms, a hydrocarboxy radical containing 1 to 20 carbon atoms, or a halogen atom, Q' is an alkylidene radical containing 1 to 20 carbon atoms, s is 0 or 1, g is 0, 1 or 2, with the proviso that s is 0 when g is 0, k is 4 when s is 1, and k is 5 when s is 0, M is as defined above, and q is an integer 0 to 3.

The hydrocarbyl radicals can be exemplified by the following radicals: methyl, ethyl, propyl, benzyl, amyl, isoamyl, hexyl, isobutyl, heptyl, octyl, nonyl, decyl, cetyl, 2-ethylhexyl and fenyl radicals. The halogen atoms comprise, e.g., chlorine, bromine, fluorine and iodine atoms, of which chlorine is preferred.

Numerous examples of individual metallocenes of formulas (I) to (III) above are disclosed by, for example, EP 206 794.

Suitable metallocene compounds are also compounds having the general formula IV $$(CP)_m MX_{b-a} \qquad \text{IV}$$

wherein the moiety (Cp) represents an unsubstituted or substituted and/or fused homo- or heterocyclopentadienyl, M is a transition metal of Group 4A, 5A, or 6A (Hubbard), X is halogen, hydrogen, or an alkyl or aryl group, m is an integer having a value from 1 to the valence of M minus one, b is an integer equal to the valence of M, and a is an integer having a value of 1 to the valence of M–1.

Preferred metallocene compounds are those compounds of formula (I), wherein Cp is a cyclopentadienyl or indenyl group, M is zirconium, titanium or hafnium, X is chlorine, m is 2, n is 0 and q is 2. Particularly suitable metallocenes are bis(cyclopentadienyl)zirconium dichloride, bis (cyclopentadienyl)titanium dichloride, bis(indenyl) zirconium dichloride and bis(indenyl)titanium dichloride. However, any metallocene compound defined above and being vapourizable without decomposition can be used according to the present invention.

As support material for the heterogenous catalysts of the present invention, inorganic oxides such as silica, alumina, silica-alumina, magnesium oxide, magnesium silicate, titanium oxide, zirconium oxide and the like can be used. Preferred support materials are silica and alumina. The surface area, pore volume and particle size of the support material can be chosen according to the requirements of the specific polymerization process, in which the catalysts will be used. Typically, support particles having a surface area of 20 to 500 $m^2/g$ (BET method), pore volume of 0.2 to 3.5 $cm^3/g$, and mean particle size of 10 to 200 tm can be used.

According to the present invention, the support material is treated with the metallocene compound under conditions where the temperature is sufficiently high to keep said metallocene compound in the vapour state, and the amount of the metallocene compound is sufficient to allow for reaction with a substantial part of the available surface sites capable of reacting with said metallocene compound. After the reaction, the non-reacted reagent, i.e., the rest of the metallocene compound not bound to the support, is removed, preferably in the vapour phase. In other words, the vaporized metallocene reagent(s) is (are) chemisorbed onto the support surface by contacting the reagent vapours with the support. The "substantial part" of the available surface sites means that the metallocene compounds should react with and chemisorb to generally more than half of said sites.

According to a preferred embodiment of the present invention, the vapourous reagent is reacted not only with a substantial part of the available surface sites but rather with essentially all surface sites which are capable of reacting with the reagent under the prevailing conditions. This situation is called saturation of the support. Therefore, the vapour pressure of the metallocene compound is kept sufficiently high during the reaction step and the duration of interaction with the support material surface sufficiently long so as to achieve saturation with the active material at the bonding sites of the support material. The partial pressure of the vaporized regent is typically in the range from about 0.010 to about 95 kPa. Lower pressures will require longer reaction times. It is particularly preferred to use a partial pressure of at least 1 kPa. The proportion of the excess active material used in relation to the concentration necessary to achieve complete saturation of all available bonding sites on the support material surface (customarily called monolayer coverage) is typically 1- to 1000-fold, preferably 1- to 3-fold. The amount of the metallocene compound necessary for a monolayer coverage can be calculated from the area of the support determined with the aid of, e.g., the BET-method; and from the density of bonding sites on the support surface.

According to the present invention, the amount of metallocene compound which can be bound to the support surface is determined by the number of the bonding sites present at the surface of the support material, provided that the reaction temperature is sufficiently high to provide the activation energy necessary for establishing a desired surface bond (chemisorption). "Available bonding sites" are groups, typically OH groups, which are capable of reacting with the metallocene molecule, thus forming a bond between the metallocene and a surface bonding site. The lowest applicable reaction temperature is the one at which the metallocene compound still exists in the vapour state under the pressure conditions used, whereas the upper limit of the reaction temperature is set at a temperature above which the metallocene reactant starts to decompose. Usually the proper reaction temperature lies in the range from 50 to 500° C., preferably from 100 to 400° C.

The reaction time is not critical as long as it is sufficient to allow the vaporous reagent to interact with the bonding sites of the support. Thus the reaction time can be selected, for instance, in the range from 0.01 hours to 100 hours, preferably 0.5 to 25 hours, but more prolonged reaction times have no harmful effect on the binding reactions. The reaction time is dependent on the reaction temperature, thus for zirconocene 1 to 2 hours is enough at 270 to 280° C., whereas temperatures around 200 ° C. require reaction times on the order of 8 hours or more.

As mentioned above, the amount of the metallocene compound to be bound onto the support material surface depends on the surface sites or groups available for the bonding reaction. Therefore, the degree of bonding can also be regulated by treating the support surface thermally or chemically in advance before contacting the surface with metallocene vapour. Thus the support can be subjected to a pretreatment at elevated temperatures prior to the actual bonding reaction. Heat treatment of the support can be applied to modify the number and character of the OH groups on the support surface and, thereby, the amount of metal species bound. Elevated temperatures reduce the number of OH groups. The heat treatment can be carried out within a wide temperature range, but temperatures from about 100° C. up to about 900° C. and heating times of 1 to 40 hours, preferably of 2 to 24 hours, have been found suitable.

Instead of or in addition to being heated, the support can be treated with suitable compounds which modify its surface in an advantageous way. Thus, a silica support can, for instance, be treated with aluminum, magnesium or silane compounds. For example, by reacting aluminum chloride and water vapour with silica, an $Al_2O_3$ layer can be formed. In addition to aluminum chloride organic compounds can be used. The following example may be mentioned: TMA (tremethylaluminum), TEA (triethylaluminum), DEALOX (diethylaluminum ethoxide), TEB (triethylboron), TIBA (triisobutylaluminum), EADC (ethylaluminum dichloride) and MAO (methylalumoxane). These compounds can be fed into the reaction chamber in the gaseous state.

It is also possible to treat the support surface with compounds which block some of the active surface sites. One example of such a compound is hexamethyl disilazane.

The reaction between the catalytically active metallocene material and the support can be carried out at ambient pressure, or alternatively, at a pressure below or above the ambient pressure. Therefore, the reaction can be carried out at pressures, for instance, in the range from about 0.1 to about 1000 mbar or even more. Reaction pressures in the range from about 1 to about 100 mbar are preferred.

The reaction with the support material and the metallocene compounds can be carried out under an atmospere containing only vaporous metallocene compounds. Preferably, the reaction is carried out under an atmosphere containing said metallocene compound as a mixture with an inert gas, such as nitrogen or a noble gas. Inert gases can also be applied to bring vapours of metallocene compounds to the reaction space. Any unreacted metallocene compounds and the possible side reaction products between the metallocene compound and the support are removed from the reaction space in the gas phase. The chemisorption reaction is therefore followed by inert gas purging at the reaction temperature to remove unreacted reagents.

According to the present invention, the treatment of the support material with the metallocene vapour of the transition metal can be carried out by using one metallocene compound, as described above, or by using two or more different metallocene compounds. It has therefore been found that by using two different metallocenes, it is possible to prepare catalysts which produce very high molecular weight polymers. In the case of using more than one transition metal compound, it is possible to treat the support material with the metallocene compound vapour as sequential treatments and by removing the vapours of each compound before the treatment with the next compound. In this case, it is possible also to treat the support material between treatments with each metallocene vapour, for example thermally or with vaporous chemicals, for example water vapour, thus affecting the active surface sites on the support material. The order of the treatments with different metallocene vapours can be varied, because it has been found that this may have a considerable effect on the polymerization properties of the catalysts and the product properties. For example, a metallocene compound of titanium can first be added onto said support material, and after that, a metallocene compound of zirconium can be added onto said support, or vice versa. However, it is also possible to treat the support material with vaporous mixtures of two or more different metallocene compounds.

It has also been found that it is possible to use a metallocene compound, for example zirconium metallocene, and a non-metallocene compound of a transition metal, for example titanium tetrachloride. For example, the support can first be reacted with the vapour of a non-metallocene transition metal compound, and then with a metallocene compound of a transition metal, or vice versa.

In the method described above, the reaction between the vaporous metallocene compound and the support material can be carried out in a closed reaction chamber enclosing the support material and equipped with proper means for maintaining the desired temperature in the reactor space including said support, and means for feeding gaseous reactants and carriers to the reaction chamber. The reaction in the reaction chamber can be carried out either in a static bed formed by the support material. Alternatively, the reaction can be carried out in a fluidized bed reactor, wherein the bed is formed by granules of the support material which are kept in the fluidized state by circulating a gaseous mixture comprising metallocene compound(s), or more preferably, a mixture of a carrier gas and gaseous metallocene compound (s) through the support material bed.

After the binding of the metallocene compounds to the support, the catalyst can be modified, i.e., activated, by adding certain organometal compounds, particularly Al-compounds. Suitable organic aluminum compounds can, for instance, be selected from the group consisting of TMA (trimethyl aluminum), TEA (triethylaluminum), DEALOX (diethylaluminum ethoxide), TEB (triethylboron), TIBA (triisobutylaluminum), EADC (ethylaluminum dichloride) and MAO (methylaluminumoxane). Methylaluminumoxane (MAO) is particularly preferred. These compounds can be reacted with the catalyst in the gaseous phase. The reaction can be carried out at similar conditions as the reaction between the support and the metallocene compound.

Other possible compounds useful as activating agents are certain ionic compounds disclosed, for example, in EP 277 004. These compounds comprise a cation, which reacts irreversibly with one ligand contained in the transition metal compound, and an anion, which is a single coordination complex comprising a plurality of lipophilic radicals covalently coordinated to and shielding a central formally charge-bearing metal or metalloid atom, which anion is bulky, labile and stable to any reaction involving the cation of the second component. The charge-bearing metal or metalloid may be any metal or metalloid capable of forming a coordination complex which is not hydrolyzed by aqueous solutions.

These compounds can be represented by the following general formula (V):

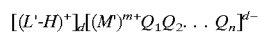

$$[(L'-H)^+]_d[(M')^{m+}Q_1Q_2\ldots Q_n]^{d-} \quad V$$

wherein

L' is a neutral Lewis base;

H is a hydrogen atom;

[L'–H] is a Bronsted acid;

M' is a metal or metalloid selected from the Groups V-B, VI-B, VII-B, VIII, I-B, II-B, III-A, IV-A and V-A;

$Q_1$ to $Q_n$ are selected, independently, from the group consisting of hydride radicals, dialkylamido radicals, alkoxide and aryloxide radicals, hydrocarbyl and substituted-hydrocarbyl radicals, and organometalloid radicals, and any one, but no more than one, of $Q_1$ to $Q_n$ may be a halide radical, the remaining $Q_1$ to $Q_n$ being independently selected from the radicals above;

m is an integer from 1 to 7;

n is an integer from 2 to 8; and n−m=d.

These and other types of ionic compounds and specific compounds disclosed in EP 277 004 and EP 478 913 can be used as activating agents according to the present invention.

It is also possible to use polymerizable olefin monomers, such as ethylene and propylene, as activating agents. In these cases, the carrier containing the metallocene compound can be brought into contact with the polymerizable monomer to form a prepolymerized catalyst, which can be used for polymerization without there being any need for adding further cocatalysts into the polymerization reactor, as is conventional. If polymerizable monomers are used as activating agents, organometal compounds, particularly Al-compounds, can be present during the prepolymerization step.

The reaction between the support, or between the support containing the catalytically active metallocene species and the organometal compound or an ionic compound specified above, can be carried out by treating the support with a solvent containing the activator used. If a polymerizable monomer is used as an activating agent, this treatment is preferably carried out by introducing gaseous monomer into the same reaction space where the support is treated with the metallocene compound.

The activator(s) may also be added to the polymerization reactor, as known per se. In that case, the catalysts are preferably transferred under nitrogen atmosphere from the reaction chamber to the polymerization reactor. If the catalysts are activated as described above, no cocatalyst addition is generally needed during polymerization.

It should be noted that many of the specified activating compounds may be added to the support in the same way as the metallocene compounds, i.e., by contacting these compounds in the vapour state with the support material. Thus, any activating compounds which can be vapourized without decomposing can be added in this way.

If methylalumoxane (MAO) is used as the activator according to the present invention, remarkably low amounts of MAO are needed for achieving fairly high polymerization activities. According to the present invention, it is therefore possible to use molar ratios between aluminum and transition metal of 1 to 3000, preferably between 25 and 100, at the same time achieving usable polymerization activities.

The catalysts according to the present invention can be used for polymerization and copolymerization of alpha-olefins (or 1-olefins) such as ethylene, propylene, butene, cyclopentene, 1-hexene, 3-methyl-1-pentene, 4-methyl-1-pentene, 1,4-hexadiene, 1-octene, 1-decene and the like.

As a polymerization method, it is possible to use any known liquid or gas phase polymerization process or multiphase process comprising one or more liquid phase polymerization step(s) and/or one or more gas phase polymerization step(s). Liquid phase polymerizations can be carried out in solution or slurry, or they can be effected as bulk polymerization by using polymerizable monomer as liquid polymerization medium.

The polymerization of 1-olefin monomers is, according to the present invention carried out by contacting, in one or more polymerization reactors in the slurry or gas phase, olefin monomers or mixtures thereof at an increased pressure of at least 500 kPa with a heterogeneous catalyst prepared according to the method of claim 1. The pressure depends on the process used. Typically, it varies from about 1.5 bar to 1,000 bar (150 kPa to 100,000 kPa), preferably it is at least 5 bar (500 kPa). Thus the pressure advantageously lies in the range from about 5 to 100 bar (500 kPa to 10,000 kPa), and in particular it is between about 7 and 75 bar (700 kPa to 7,500 kPa). The operational pressures of slurry processes are somewhat higher than those used in gas phase polymerization processes. The polymerization temperature is from about 20 to about 300° C., preferably from about 50 to 275° C. The partial hydrogen pressure is in the range from 0 to about 20 bar (2,000 kPa), preferably it is from about 0.1 (10 kPa), in particular from about 0.5 bar (50 kPa) to about 10 bar (1,000 kPa).

The present invention provides several significant advantages compared to conventional catalysts. The present catalysts are very easily prepared. Since no solvents are used in the reaction between the metallocene compounds and the support, no evaporation and washing steps are needed. No extra amounts of metallocene compounds are added to the support as in conventional impregnation methods. Because no evaporation steps are needed, which could cause extra amounts of metallocene compound to precipitate on the support, the method according to the present invention is also very economical compared to the conventional impregnation methods. In addition, no solvent recovery or recycling is needed, which has a great impact on the economy of the catalyst preparation process.

As a particular benefit, it is worthwhile mentioning that the catalysts according to the present invention are very active even if very low amounts of activator agents, such as alumoxane, are used. Furthermore, the polymerization performance of the catalysts can be easily regulated during the preparation of the catalysts and/or by the polymerization conditions. Thus, by using different support pretreatment temperatures, polymerization conditions and/or by using two or more different metallocenes, and by altering the order in which they are added on the support, it is possible to control and regulate the activity of the catalysts and the polymer properties, such as molecular weight and molecular weight distribution. For example, by adding metallocene compounds of titanium together with metallocene compounds of zirconium, it is possible remarkably to increase the molecular weight of the polymers, even if the polymerization activity of said titanium compounds alone is rather low.

The following non-limiting examples describe the invention in more detail.

Experimental

A. Catalyst Preparation

The catalyst samples were prepared in a C-120 ALE-reactor (Microchemistry Ltd.). Nitrogen was used as carrier gas. Reactor pressures of 80 to 100 mbar were used. The support materials were preheated at 300 to 900° C. for 16 h in air and additionally for 3 h at low pressure in nitrogen flow at 300 to 450° C. The reactants were vapourized at temperatures in excess of 180° C. Reaction temperature was varied between 200 and 350° C. Reaction time was 1 to 2 hours, after which the reactor was purged with nitrogen at the reaction temperature. The samples were cooled in nitrogen flow and transferred inertly to analysis and polymerization.

The number of bonding sites of the preheated (300 to 900° C.) support can be determined by H-NMR, if desired. The amount of the reagent needed can thus be calculated, when the number of the bonding sites is known. An overdose (1 to 2 times the amount corresponding the number of the bonding sites) may be vapourized, because the saturation level of the metal concerned is not affected by the overdosing. Zirconium content was determined by X-ray fluorescence spectrometry (XRF) or by instrumental neutron activation analysis (INAA). Titanium content was determined by INAA. UV-VIS spectrophotometry was also used for Ti-determinations. Chloride was determined in the samples by potentiometric titration.

B. Polymerization

Polymerizations were carried out in 3 or 2 dm$^3$ stainless steel autoclave reactors equipped with paddle stirrer and continuous supply of ethylene. The reactor, which was beforehand heated up to 100° C. and evacuated, and after that flushed with nitrogen to remove all moisture and oxygen, was charged with 1.8 or 1.3 dm$^3$ of dry and deoxygenated n-pentane. Then catalyst and activator were fed into the reactor with nitrogen pressure. Hydrogen, if used, was fed from a bomb of 48 cm$^3$ to the reactor simultaneously with ethylene. The reactor was heated up to the desired temperature of 70° C. and ethylene was introduced into the reactor. Continuous flow of ethylene kept the ethylene partial pressure at 1000 kPa during the polymerization run. Normally, polymerization time was 60 minutes after which the pressure from the reactor was rapidly released and the reactor was cooled down. After evaporating the pentane off the polymer, yield was weighed.

The Melt Flow Rates (MFR) of the produced polymers were measured according to the ISO 1133 method. The measurements were done at 190° C. using nominal loads of 2.16 kg, 5.0 kg and 21.6 kg weights and the values $MFR_2$, $MFR_5$ and $MFR_2$, obtained respectively in units $g_{polymer}/10$ min. Flow Rate Ratio (FRR) values were obtained by dividing the corresponding MFR values. Thus $FRR_{21/2}$ is $MFR_{21}$ divided by $MFR_2$. The $FRR_{21/5}$ and $FRR_{5/2}$ were calculated in the same way.

High temperature Gel Permeation Chromatography (GPC) was used to determine the average molecular weights ($M_w$, $M_n$) and molecular weight distributions (Polydispersity $D=M_w/M_n$) of the produced polymers. The measurements were done at 135° C. using 1,2,4-trichlorobenzene as solvent.

EXAMPLE 1

Preparation of Zirconocene/Silica Catalysts

In this example, zirconocene dichloride, ($ZrCp_2Cl_2$) was used (Cp=cyclopentadienyl) as metallocene compound, and as support material, silica having a surface area of 270 m$^2$/g and pore volume of 1.58 ml/g (Grace 955). A number of catalyst samples were prepared as illustrated above at different reaction temperatures. The silica used was preheated before reaction at 600° C. for 16 hours and at 450° C. for 3 hours. The results are presented in following Table 1.

TABLE 1

| Sample | Reaction temperature ° C./h | Element concentration (wt %) | | | |
|---|---|---|---|---|---|
| | | Zr | Ti | Cl | C |
| 1 | 180–200/4 | 4.6 | — | 1.9 | 4.5 |
| 2 | 240/3 | 4.8 | — | 1.9 | 4.8 |
| 3 | 280/3 | 4.4 | — | 2.0 | 4.0 |
| 4 | 280/3 | 4.4 | — | 2.0 | 4.3 |
| 5 | 300/3 | 4.4 | — | 1.9 | 4.4 |
| 6 | 330/3 | 4.3 | — | 1.8 | 4.0 |
| 7 | 350/3 | 4.3 | — | 1.9 | 3.6 |

EXAMPLE 2

Preparation of Zirconocene/Silica Catalysts on Supports Preheated at Different Temperatures The experiments of Example 1 were repeated by using a reaction temperature of 280° C. and a reaction time of 3 hours. The preheating temperature of the support before the binding reaction was varied between 300 and 900° C. The results are indicated in Table 2 below.

TABLE 2

| Sample | Reaction temperature °C./h | Element concentration (wt %) | | | |
|---|---|---|---|---|---|
| | | Zr | Ti | Cl | C |
| 8 | 300/16 | 6.5 | — | 3.4 | 4.1 |
| 9 | 450/16 + 400/3 | 5.7 | — | 2.5 | 4.7 |
| 10 | 600/16 + 450/3 | 4.4 | — | 2.0 | 4.0 |
| 11 | 750/16 + 450/3 | 3.6 | — | 1.5 | 4.0 |
| 12 | 820/16 + 450/3 | 3.1 | — | 1.2 | 3.3 |
| 13 | 900/16 + 450/3 | 1.1 | — | 0.45 | 1.1 |

EXAMPLE 3

Polymerization of Ethylene

Ethylene was polymerized as described above under section B by using catalyst sample 3 of Example 1, wherein the zirconium content was 4.4 wt-%. Methylalumoxane (MAO) was used as activator and hydrogen was used as molecular weight modifier, except in runs 5 and 6. The polymerization conditions and the properties of the polymers obtained are described in the following Table 3.

TABLE 3

| Run no. | 1 | 2 | 3 | 4 | 5 | 6 |
|---|---|---|---|---|---|---|
| Catalyst amount (mg) | 44 | 44 | 32 | 47 | 22 | 33 |
| Al/Zr (mol/mol) | 67 | 67 | 98 | 62 | 67 | 95 |
| $H_2$ bar/48 ml | 5 | 4 | 5 | 2 | — | — |
| Run time (min) | 34 | 39 | 26 | 60 | 60 | 60 |
| Activity gPE/gcat/h | 6700 | 5490 | 9400 | 2150 | 2860 | 3910 |
| $MFR_{2.16}$ | 6.1 | 8.4 | 15.9 | 10.2 | 0.4 | 0.8 |
| $M_w$ | 72000 | 62400 | n.d. | 65100 | 337000 | n.d. |
| $M_w/M_n$ | 5.8 | 5.3 | | 3.9 | 3.0 | | n.d. = not determined

The effect of hydrogen on catalyst performance was studied in this example. Hydrogen clearly increased the catalyst activity compared to runs without hydrogen. Also the molecular weight and molecular weight distribution can be controlled by adding different amounts of hydrogen.

EXAMPLE 4

Polymerization of Ethylene

Ethylene was polymerized as in Example 3, but without using hydrogen as modifier. In this example different amounts of activator were used.

The results are presented in Table 4 below.

TABLE 4

| Run no. | 1 | 2 | 3 | 4 |
|---|---|---|---|---|
| Catalyst amount (mg) | 50 | 11 | 22 | 33 |
| Al/Zr mol/mol | 370 | 450 | 67 | 95 |
| $H_2$/48 ml | — | — | — | — |
| Run time (min) | 34 | 90 | 60 | 60 |

TABLE 4-continued

| Run no. | 1 | 2 | 3 | 4 |
|---|---|---|---|---|
| Activity gPE/gcat/h | 9000 | 6670 | 2860 | 3910 |
| $MFR_{21.6}$ | 3.0 | 0.6 | 0.4 | 0.8 |
| $M_w$ | n.d. | n.d. | 337000 | n.d. |
| $M_w/M_n$ | | | 3.0 | | n.d. = not determined

It is apparent from the results above that by increasing activator amounts, higher activities are obtained.

EXAMPLE 5

Polymerization of Ethylene

Ethylene was polymerized as described above under Section B by using catalyst samples 4, 8, 12 and 13 prepared in Examples 1 and 2 by using different preheating of catalyst supports. Methylalumoxane (MAO) was used as activator agent. Hydrogen (1.5 bar/48 ml) was used as molecular weight modifier. The polymerization conditions and the properties of the polymers obtained are described in the following Table 5.

TABLE 5

| Run no. | 1 | 2 | 3 | 4 | 5 |
|---|---|---|---|---|---|
| Catalyst sample | 8 | 4 | 12 | 4 | 13 |
| $SiO_2/°C.$ | 300 | 600 | 820 | 600 | 900 |
| Zr/wt % | 6.5 | 4.4 | 3.1 | 4.4 | 1.2 |
| Catalyst amount/mg | 23 | 31 | 40 | 215* | 111 |
| Al/Zr (mol/mol) | 46 | 50 | 55 | 25 | 51 |
| Run time (min) | 60 | 60 | 60 | 35 | 60 |
| Activity gPE/gcat/h | 1040 | 2290 | 1730 | 880 | 670 |
| $MFR_{2.16}$ | 41.4 | 27.1 | 9.7 | 0.2 | 14.0 |
| $M_w$ | 33900 | 43600 | 65900 | n.d | 62800 |
| $M_w/M_n$ | 2.9 | 4.2 | 4.4 | | 4.7 |

* = MAO included
n.d. = not determined

In this example, the effect of different silica preheating temperatures on catalyst performance was studied. From the results presented in Table 5, it can be seen that molecular weight and molecular weight distribution can be controlled by the silica preheating temperature.

EXAMPLE 6

Preparation of Titanocene/Silica Catalysts

In this example, titanocene dichloride ($TiCP_2Cl_2$) was used as metallocene compound and silica (Grace 955) as support material. A number of catalyst samples were prepared as illustrated above at different reaction temperatures. The silica used was preheated before reaction at 600° C. for 16 hours and at 450° C. for 3 hours. The results are presented in following Table 6.

TABLE 6

| Sample | Reaction temperature °C./h | Element concentration (wt %) | | | |
|---|---|---|---|---|---|
| | | Zr | Ti | Cl | C |
| 14 | 200–250/4 | — | 2.4 | 2.4 | 4.3 |
| 15 | 280/3 | — | 2.3 | 2.4 | 3.4 |

TABLE 6-continued

| Sample | Reaction temperature °C./h | Element concentration (wt %) | | | |
|---|---|---|---|---|---|
| | | Zr | Ti | Cl | C |
| 16 | 300/3 | — | 2.2 | 2.5 | 3.1 |
| 17 | 330/3 | — | 2.1 | 2.3 | 3.2 |
| 18 | 350/3 | — | 2.3 | 2.4 | 2.8 |

EXAMPLE 7

Preparation of Titanocene/Silica Catalysts Using Supports Preheated at Different Temperatures The experiments of Example 6 were repeated by using a reaction temperature of 280° C. and a reaction time of 3 hours. The preheating temperature of the support before the bonding reaction was varied between 300 and 900° C. The results are indicated in Table 7 below.

TABLE 7

| Sample | Preheating temperature °C./h | Element concentration (wt %) | | | |
|---|---|---|---|---|---|
| | | Zr | Ti | Cl | C |
| 19 | 300/16 + 3 | | 3.4 | 3.3 | 4.3 |
| 20 | 450/16 + 450/3 | | 2.9 | 3.0 | 3.9 |
| 21 | 600/16 + 450/3 | | 2.3 | 2.4 | 3.4 |
| 22 | 750/16 + 450/3 | | 1.8 | 2.1 | 2.8 |
| 23 | 820/16 + 450/3 | | 1.5 | 1.8 | 2.4 |
| 24 | 900/16 + 450/3 | | 0.78 | 0.58 | 0.7 |

EXAMPLE 8

Preparation of Bimetallic Catalysts

Bimetallic catalyst systems were prepared by adding two different metallocene compounds on a silica surface by using different preheating temperatures and different reaction temperatures. The reagents were pulsed after each other by using a nitrogen purge of 2 to 3 hours at the reaction temperature between reactant pulses. The results are shown in Table 8 below.

TABLE 8

| Sample | Preheating T °C./h | Reaction T °C./h | Element concentration (wt %) | | | |
|---|---|---|---|---|---|---|
| | | | Zr | Ti | Cl | C |
| 24 | 750/16 + 450/3 | ZrCpCl TiCpCl* 280/2 | <0.1 0.84 | 1.91 1.45 | 2.0 1.8 | 3.0 3.3 |
| 25 | 900/16 + 450/3 | ZrCpCl TiCpCl* 280/2 | <0.1 <0.1 | 0.81 0.80 | 1.0 1.0 | 1.5 1.5 |
| 26 | 820/16 450/3 | TiCpCl 280/2 ZrCpCl 280/2 | 2.5 2.4 | 0.42 0.32 | 1.4 1.4 | 4.0 3.7 |
| 27 | 300/16 + 4 | ZrCl₄ 300/2 TiCpCl 280/3 | 3.3 | 1.7 | 4.2 | 2.5 |
| 28 | 750/16 + 450/3 | ZrCl₄ 300/2 TiCpCl 280/3 | 1.8 | 0.55 | 1.9 | 0.9 |
| 29 | 300/16 + 3 | TiCpCl 280/3 ZrCl₄ 300/2 | 7.0 | 0.17 | 7.1 | 0.8 |
| 30 | 820/16 + 450/6 | ZrCpCl 280/2 TiCpCl 280/2 | 0.55 | 1.35 | 1.76 | 2.78 |
| 31 | 600/16 + 450/6 | ZrCpCl 280/2 TiCpCl 280/2 | 0.65 | 2.29 | 2.35 | 3.57 |
| 32 | 600/16 + 450/3 | TiCpCl 280/2 ZrCpCl 280/2 | 2.6 | 0.81 | 2.0 | 4.5 |
| 33 | 600/16 + 450/3 | TiCpCl 300/2 ZrCl₄ 300/2 | 3.8 | 0.06 | 3.85 | 0.61 |
| 34 | 600/16 + 450/3 | TiCpCl 280/2 ZrCpCl 300/2 | 3.8 | 0.02 | 3.92 | 0.29 |
| 35 | 600/16 + 450/3 | TiCl₄ 175/2 ZrCpCl 280/2 | 3.8 3.8 | 0.23 0.27 | 1.9 2.2 | 4.4 4.4 |
| 36 | 600/16 + 450/3 | ZrCpCl 28072 TiCl₄ 175/2 | 4.0 4.5 | 0.33 0.02 | 2.3 2.3 | 4.4 4.5 |

EXAMPLE 9

Polymerization of Ethylene Using Mono- and Bimetallic Catalysts

Polymerizations were carried out as in Example 3 by using hydrogen (1.5 bar/48 ml) as Mw modifier. The tests were carried out by using catalyst sample 4 of Example 1, sample 12 of Example 2, and samples 26, 30, 31, 32 and 35 of Example 8. The results are presented in Table 9 below.

TABLE 9

| Run no. | 1 | 2 | 3 | 4 | 5 | 6 | 7 |
|---|---|---|---|---|---|---|---|
| Catalyst sample | 4 | 32 | 31 | 35 | 12 | 26 | 30 |
| Preheating temperature °C. | 600 | 600 | 600 | 600 | 820 | 820 | 820 |
| Pulsing order | Zr | Ti + Zr | Zr + Ti | $TiCl_4$ + Zr | Zr | Ti + Zr | Zr + Ti |
| Catalyst amount (mg) | 31 | 35 | 27 | 32 | 40 | 43 | 48 |
| Activity gPE/gcat/h | 2290 | 2090 | 260 | 1750 | 1730 | 2000 | 170 |
| $MFR_{21.6}$ g/10 min | n.d. | 1.0 | 2.1 | 2.6 | n.d. | 2.2 | 2.5 |
| $M_w$ (g/mol) | 43600 | 357000 | 226500 | 240000 | 65900 | 274500 | 224000 |
| $M_w/M_n$ | 4.2 | 6.2 | 4.2 | 6.1 | 4.4 | 5.6 | 5.7 |

Zr = $Cp_2ZrCl_2$
Ti = $Cp_2TiCl_2$

By adding a second transition metal compound in addition to the zirconium compound, it is possible to control the molecular weight and molecular weight distribution. It can also be noted that the order of adding these compounds on silica has a significant effect, e.g., on activity.

EXAMPLE 10

Preparation of Zirconocene/Alumina Catalysts

Zirconocene dichloride catalysts were prepared by using alumina (Akzo, alumina grade B) as the support material. The alumina support was preheated at three different temperatures. The reaction was carried out at 300° C. during 2 hours, after which the reaction space was purged with nitrogen at 300° C. for one hour. The properties of the catalysts are presented in Table 10 below.

TABLE 10

| | Preheating | Element concentration (wt %) | | | |
|---|---|---|---|---|---|
| Sample | Temperature °C./h | Zr | Ti | Cl | C |
| 37 | 300/16 | 9.4 | — | 2.8 | 7.2 |
| 38 | 600/16 + 450/3 | 6.9 | — | 2.6 | 5.0 |
| 39 | 750/16 + 450/3 | 3.7 | — | 2.0 | 2.9 |
| 40 | 600/16 + 450/3* | 6.3 | — | 4.8 | 2.7 |

*Reaction temperature 280° C., reaction time 2 hours

EXAMPLE 11

Polymerization of Ethylene Using Zirconocene/Alumina Catalysts

Polymerization tests were carried out by using catalyst samples 38 and 40 of Example 10. The results are presented in Table 11 below.

TABLE 11

| Run no. | 1 | 2 | 3 |
|---|---|---|---|
| Catalyst sample | 38 | 38 | 40 |
| Zr/wt % | 6.9 | 6.9 | 6.3 |
| Catalyst amount/mg | 18 | 305 | 65 |
| Al/Zr | 50 (MAO) | 50 (TMA) | 60 (MAO) |
| $H_2$ bar/48 ml | 1.5 | 1.5 | not used |
| Run time (min) | 60 | 60 | 60 |
| Activity gPE/gcat/h | 220 | 20 | 490 |
| $MFR_{21.6}$ | n.d. | n.d. | 0.1 |

In this Example, polymerizations were done with catalysts where silica had been replaced with alumina. These catalysts had lower activities than silica supported ones. It is also possible to activate catalysts with normal aluminium alkyl compounds such as TMA (trimethyl aluminium).

EXAMPLE 12

Zirconocene/silica Catalysts Prepared Using bis(indenyl)zirconium Dichloride as Metallocene Compound Bis(indenyl)zirconium dichloride was used as the metallocene compound bound to a silica surface (Grace 955). The support material was preheated at 600° C. for 16 hours and at 450° C. for 3 hours. The reaction temperature and time were 260° C. and 3 hours, respectively. After the reaction, the catalyst was purged with nitrogen at 260° C. for 2 hours.

The catalyst thus prepared had a zirconium content of 3.2 wt-%, a carbon content of 3.0 wt-%, and a chloride content of 2.2 wt-%.

45 mg of the catalyst above was used for polymerization of ethylene at a temperature of 71 to 75° C. for 21 minutes. Hydrogen pressure used in the polymerization was 150 kPa/48 ml. A polymerization yield of 56 g was achieved, which corresponds an activity of 3570 gPE/gcat/h.

EXAMPLE 13

Binding of $ZrCp_2Cl_2$ on Silica After Treatment with $H_2O$ and TMA

Silica (Grace 955) was preheated at 800° C. and 600° C., respectively, in air for 16 h and at 450° C. for 3 h in nitrogen flow at a pressure of 80 to 100 mbar. $ZrCp_2Cl_2$ was vaporized and brought to the silica surface at 300° C. in such a way that all bonding sites available were saturated. A nitrogen purge at 300° C. followed the reactant pulse. Water vapour was brought next to the surface at temperatures of 120, 150, 200 and 300° C., respectively. A nitrogen purge again followed at the reaction temperature of water. Then trimethylaluminium (TMA) vapour was pulsed at 80° C. to the surface, followed again by a nitrogen purge at the same temperature. Table 12 shows the Zr, Al, C and Cl concentrations in the samples.

TABLE 12

| | Preheating | Reactants | Element concentration (wt %) | | | |
|---|---|---|---|---|---|---|
| Sample | T °C./h | T °C./h | Zr | Al | Cl | C |
| 41 | 800 | Zr 300/2 water 120/1 TMA 80/3 | 2.7 after water | 1.7 | 1.2 after water | 1.1 after water 2.3 |

TABLE 12-continued

| Sample | Preheating T °C./h | Reactants T °C./h | Element concentration (wt %) | | | |
|---|---|---|---|---|---|---|
| | | | Zr | Al | Cl | C |
| 42 | 600 | Zr 300/2 water 150/1 TMA 80/3 | 5.2 after water | 2.8 | 1.6 after water | 3.1 after water |
| 43 | 600 | Zr 300/2 water 200/2 TMA 80/3 | 5.2 after water | 3.5 | 1.1 after water | 0.8 after water 3.4 |
| 44 | 600 | Zr 300/2 water 300/2 TMA 80/3 | 5.0 | | 0.6 after water | 0.3 after water 2.5 |

EXAMPLE 14

Preparation of Catalysts Using Different Precursors

Different precursors for binding the active metal were used. The following examples show the preparation conditions, when SiO2 Grace 955 preheated at 600° C. for 16 h in air in ambient pressure +at 450° C. for 3 hours in nitrogen flow at 50–100 mbar unless otherwise indicated. Alumina used as support was preheated at 600° C. for 16 h in air in ambient pressure +at 450° C., in nitrogen flow at 50–100 mbar. n-but-Cp=n-butyl cyclopentadienyl, Ind=indenyl Each reactant was brought to the reaction chamber one by one followed by a nitrogen purge at the reaction temperature concerned for at least one hour before the second reactant.

TABLE 13

| Sample | Reactant | Reaction temperature/ time °C./h | Zr concentration wt % | Cl concentration wt % | C concentration wt % |
|---|---|---|---|---|---|
| 45 | (n-but-Cp)$_2$ZrCl$_2$ | 190/3 | 2.1 | 0.5 | 2.3 |
| 46 | CpTiCl$_3$ | 180/4 | — | 3.8 | 3.7 |
| 47 on alumina | CpTiCl$_3$ | 170/2 | — | 4.4 | 2.7 |
| 48 | B(OCH$_3$)$_3$ (Ind)$_2$ZrCl$_2$ | 170/2 + 250/3 | 2.5** | 1.1 | 4.9 |

TABLE 13-continued

| Sample | Reactant | Reaction temperature/ time °C./h | Zr concentration wt % | Cl concentration wt % | C concentration wt % |
|---|---|---|---|---|---|
| 49 | ZrCp$_2$Cl$_2$ | 200/8 | 4.8 | 2.1 | 5.5 |
| 50 | Cp$_2$Cr | 120/8 | | | |
| 51 | Cp$_2$V | 160/12 | | | |
| 52 | Cp$_2$Ni | 100/6 | | | |

46 Ti concentration 3.0 wt %
47 Ti concentration 4.4 wt %
48 B concentration 0.6 wt %

The following catalysts were prepared by vaporizing the reactants to surface saturation on MAO/SiO$_2$ (Witco). MAO/SiO$_2$ was transferred in nitrogen atmosphere to and from the reaction chamber. The preheating of the support before the chemisorption of the reactant was 10 min. - 1 hour. Chemisorption of each reactant was followed by a nitrogen purge at the reaction temperature concerned for at least 1 hour.

TABLE 14

| Sample | Reactant | Reaction temperature/ time °C./h | Metal/ concentration wt % | Cl concentration wt % | C concentration wt % |
|---|---|---|---|---|---|
| 53 | CpTiCl$_3$ | 170/4 | Ti 1.7 | 3.8 | 10.7 |
| 54 | (Ind)$_2$Zr(CH$_3$)$_2$ | 170/4 | Zr n.d. | n.d. | n.d. |
| 55 | (Ind)$_2$ZrCl$_2$ | 240/5 | Zr 2.3 | 2.0 | 9.6 |
| 56 | CpZrCl$_3$ | 170/8 | Zr 4.2 | 5.2 | 9.1 |
| 57 | ZrCp$_2$Cl$_2$ | 200/24 | Zr 2.4 | 2.5 | n.d. |
| 58 | ZrCp$_2$Cl$_2$ + TiCp$_2$Cl$_2$ | 200/6 + 200/4, 220/8 | Zr 1.7 Ti 0.9 | 5.0 | 9.6 |
| 59 | Cp$_2$V | 160/6 | V 0.6 | n.d. | n.d. |
| 60 | Cp$_2$Cr | 120/8 | Cr 0.2* | n.d. | n.d. |
| 61 | Cp$_2$Ni | 100/6 | | | |

*only Cr oxidable to Cr(VI) was determined
n.d. = not determined

All samples were transferred inertly in dry nitrogen atmosphere for polymerization.

Example 15
Polymerization of Ethylene

The MAO/silica catalysts prepared in Example 14 were used for polymerization of ethylene. The Al-content of the support was 17 wt-%. The polymerizations were carried out in the following conditions: $P_{c2}$=10 bar, medium n-pentane, 60 min. run.

TABLE 15

| Sample | 53 | 54 | 55 | 56 | 57 | 59 | 60 |
|---|---|---|---|---|---|---|---|
| Compound | CpTiCl$_3$ | (Ind)$_2$ZrMe$_2$ | (Ind)$_2$ZrCl$_2$ | CpZrCl$_3$ | Cp$_2$ZrCl$_2$ | Cp$_2$V | Cp$_2$Cr |
| Polymerization T/° C. | 80 | 70 | 80 | 80 | 80 | 80 | 80 |
| H$_2$/(ml/bar) | — | 80 | — | — | — | — | — |
| Cat. amount/mg | 519 | 293 | 276 | 275 | 414 | 267 | 134 |
| Yield/gPE | 25 | 19 | 1.4 | 2.1 | 6.0 | 8.3 | 2.0 |
| Activity | | | | | | | |
| gPE/g$_{car}$/h | 48 | 65 | 5 | 8 | 14 | 31 | 15 |
| gPE/g$_{metal}$/h | 2834 | | 221 | 147 | 604 | 5181 | 7463 |
| BD (kg/m$^3$) | 275 | 261 | — | — | — | — | — |
| MFR$_{21}$ | no flow | 5.35 | — | — | — | — | — |
| MFR$_2$ | — | 0.23 | — | — | — | — | — |
| FRR$_{21/2}$ | — | 23.3 | — | — | — | — | — |

Cp = cyclopentadienyl
Ind = indenyl

Another set of catalysts prepared on MAO/silica or silica support were tested for polymerization of ethylene. The polymerization conditions were: $P_{c2}$=10 bar, medium n-pentane, 60 min. run. The results are indicated in Table 16 below.

TABLE 16

| Sample | 50 | 51 | 59 | 60 |
|---|---|---|---|---|
| Compound | Cp$_2$Cr | Cp$_2$V | Cp$_2$V | Cp$_2$Cr |
| Support | silica | silica | MAO/silica | MAO/silica |
| Al-alkyl | — | MAO | — | — |
| Al/Metal | — | 163 | 64 | 166 |
| T$_{POLYM}$/° C. | 80 | 80 | 80 | 80 |
| Cat. amount/mg | 211 | 143 | 267 | 134 |
| Yield/gPE | 5.0 | 3.6 | 8.3 | 2.0 |
| Activity | | | | |
| gPE/g$_{cat}$h | 24 | 25 | 31 | 15 |
| gPE/g$_{METAL}$/h | 11848 | 5035 | 6217 | 7463 |

Cp = cyclopentadienyl
Ind = indenyl

EXAMPLE 16

Catalysts Prepared Using bis(n-butylcyclopentadienyl)zirconium Dichloride as Metallocene Compound 56 mg of the catalyst was used for polymerization. MAO was added to the reactor to reach Al/Zr molar ratio of 50 (also in Example 12). Polymerization was carried out at 70° C. for 60 minutes. Hydrogen was used as in Example 12. The polymerization yield was 103 g of PE, which corresponds to an activity of 1840 gPE/gcat/h.

EXAMPLE 17

Catalysts Prepared on Silica Support Pretreated with Aluminum Compounds

ZrCp$_2$Cl$_2$ was vaporized at 270° C. and reacted with a silica support (Grace 955). Before the reaction the support had been contacted with TMA. The results of the catalyst preparation are given in Table 17.

TABLE 17

| Sample | Preheat T (° C.)/ time (h) | Reaction T (° C./h) | Zr (wt %) | Al (wt %) | Cl (wt %) | C (wt %) |
|---|---|---|---|---|---|---|
| 62 | 200/16 | TMA 80/2 ZrCp$_2$Cl$_2$ 300/2.5 TMA 70/2 | 0.22 | 5.1 | not determined | 3.0 |
| 63 | 100/16 + 3 | TMA 80/4 ZrCp$_2$Cl$_2$ 280/3 | 0.73 | 4.6 | 0.7 | 2–9 |

Sample 62 gave 0.10 kg PE/g cat/h at 70° C. with 72 ml H$_2$/bar and with 0.4 ml 10% MAO added. Sample 63 polymerized at 70° C. only together with a cocatalyst. Addition of 0.5 ml 10% MAO gave at 70° C with 72 ml H$_2$/bar 0.06 kg PE/g cat/h.

What is claimed is:

1. A process for polymerizing 1-olefin monomers, comprising contacting, in one or more polymerization reactors in the slurry or gas phase, olefin monomers or mixtures thereof at an increased pressure of at least 500 kPa with a heterogeneous catalyst prepared by a process comprising:

chemisorbing, in a reaction chamber, a vapourized metallocene compound or a precursor thereof onto an inorganic support at a temperature which is sufficiently high to keep said metallocene compound in the vapour state during said chemisorbing; and removing any unreacted metallocene compound in the vapour state so as to form a heterogenous metallocene catalyst in said reaction chamber; and wherein the metallocene compound has a metal selected from the group consisting of Zr, Ti and Hf.

2. The process according to claim 1, wherein said polymerization is carried out at a partial hydrogen pressure of at least 10 kPa.

3. A process for polymerizing 1-olefin monomers, comprising contacting, in one or more polymerization reactors in the slurry or gas phase, olefin monomers or mixtures thereof at an increased pressure of at least 500 kPa with a heterogeneous catalyst prepared by a process comprising:

(a) vapourizing a metallocene compound without decomposition of said metal;

(b) treating a solid inorganic support with the vapourized metallocene compound at a temperature of about 50° C. to 500° C., which is sufficiently high to keep said metallocene compound in the vapour state without decomposition;

(c) contacting said solid inorganic support with a sufficient amount of said vapourized metallocene compound to permit reaction between said vapourized metallocene compound and at least a substantial part of the available surface sites on said solid inorganic support which can react with said vapourized metallocene compound;

(d) removing metallocene compound not bound to said solid inorganic support thereby obtaining a heterogeneous catalyst product; and (e) optionally treating the product thus obtained with an activating agent;

wherein the metallocene compound has a metal selected from the group consisting of Zr, Ti and Hf.

4. The process for polymerizing 1-olefin monomers according to claim 3, wherein in the process for preparing the heterogeneous catalyst the treatment of said solid inorganic support with said vapourized metallocene compound is carried out in a reaction chamber where said solid inorganic support is in a static bed.

5. The process for polymerizing 1-olefin monomers according to claim 2, wherein in the process for preparing the heterogeneous catalyst treatment of said solid inorganic support with said vapourized metallocene compound is carried out in a reaction chamber where said solid inorganic support is in a fluidized state.

6. The process for polymerizing 1-olefin monomers according to claim 2, wherein in the process for preparing the heterogeneous catalyst the vapour pressure of said metallocene compound is sufficient, and wherein the duration of said reaction between said vapourized metallocene compound and said solid inorganic support is sufficient to provide a molar amount of said vapourized metallocene compound that is at least equal to the number of available bonding sites on said solid inorganic support.

7. The process for polymerizing 1-olefin monomers according to claim 2, wherein in the process for preparing the heterogeneous catalyst two or more different metallocene compounds are reacted sequentially or simultaneously from the vapour state with said solid inorganic support.

8. The process for polymerizing 1-olefin monomers according to claim 2, wherein in the process for preparing the heterogeneous catalyst said metallocene compound has a formula selected from the group consisting of formula I:

$$(Cp)_m MR_n X_q$$

wherein
(Cp) is selected from the group consisting of a homo- or heterocyclopentadienyl, and a fused homo- or heterocyclopentadienyl; M represents a metal selected from the group consisting of Zr, Ti and Hf;
R represents a hydrocarbyl or hydrocarboxy group having 1 to 20 carbon atoms;
X represents a halogen atom; and
m is an integer of from 1 to 3, n is an integer of from 0 to 3, q is an integer of from 0 to 3, and the sum of m+n+q corresponds to the oxidation state of M;
formula II:

$$(CPR'_k)_q R''_s (CpR'_k) MQ_{3-q} \qquad \text{II;}$$

and
formula III:

$$R''_s (CPR'_k)_2 MQ' \qquad \text{III}$$

wherein
(CPR'$_k$) is selected from the group consisting of a homo- or heterocyclopentadienyl, and a fused homo- or heterocyclopentadienyl; each R' is the same or different, and is selected from the group consisting of hydrogen and a hydrocarbyl radical;
R" is selected from the group consisting of a $C_1-C_4$ alkylene radical, a dialkylgermanium radical, a silicon alkylphosphine radical, an amine radical, and a group of 1 to 8 atoms bridging two (CpR'$_k$) rings;
Q is selected from the group consisting of hydrocarbyl radical containing 1 to 20 carbon atoms, a hydrocarboxy radical containing 1 to 20 carbon atoms, and a halogen atom;
Q' is an alkylidene radical containing 1 to 20 carbon atoms; s is 0 or 1, g is 0, 1, or 2, with the proviso that s is 0 when g is 0, k is 4 when s is 1, and k is 5 when s is 0;
M represents a metal selected from the group consisting of Zr, Ti and Hf; and
q is an integer of 0 to 3.

9. The process for polymerizing 1-olefin monomers according to claim 8, wherein in the process for preparing the heterogeneous catalyst said hydrocarbyl radical Q containing 1 to 20 atoms is selected from the group consisting of an aryl radical, and alkyl radical, an alkenyl radical, and alkylaryl radical, an arylalkyl radical, and a hydrocarbyl radical in which two carbon atoms are attached to form a $C_4-C_6$ ring.

10. The process for polymerizing 1-olefin monomers according to claim 9, wherein in the process for preparing the heterogeneous catalyst said hydrocarbyl radical Q is selected from the group consisting of a methyl radical, an ethyl radical, a propyl radical, a benzyl radical, an amyl radical, an isoamyl radical, a hexyl radical, an isobutyl radical, a heptyl radical, an octyl radical, a nonyl radical, a decyl radical, a cetyl radical, a 2-ethylhexyl radical, and a phenyl radical.

11. The process for polymerizing 1-olefin monomers according to claim 8, wherein in the process for preparing the heterogeneous catalyst a metallocene compound of titanium is first reacted with said solid inorganic support and after that, a metallocene compound of zirconium is reacted with said solid inorganic support, or wherein a metallocene compound of zirconium is first reacted with said solid inorganic support and after that, a metallocene compound of titanium is reacted with said solid inorganic support.

12. The process for polymerizing 1-olefin monomers according to claim 2, wherein in the process for preparing the heterogeneous catalyst said metallocene compound has the formula IV:

$$(CP)_m MX_{b-a} \qquad \text{IV}$$

wherein
(Cp) is selected from the group consisting of a homo or- heterocyclopentadienyl, and a fused homo- or heterocyclopentadienyl;
M is a metal selected from the group consisting of Zr, Ti and Hf;
X is selected from the group consisting of a halogen atom, a hydrogen atom, and an aryl group;
m is an integer having a value from 1 to the valence of M minus one;
b is an integer equal to the valence of M; and
a is an integer having a value of 1 to the valence of M−1−.

13. The process for polymerizing 1-olefin monomers according to claim 12, wherein in the process for preparing the heterogeneous catalyst said metallocene compound is selected from the group consisting of bis(cyclopentadienyl)zirconium dichloride, bis(indenyl)zirconium dichloride, bis(cyclopentadienyl)titanium dichloride, and bis(indenyl)titanium dichloride.

14. The process for polymerizing 1-olefin monomers according to claim 8, wherein in the process for preparing the heterogeneous catalyst said solid inorganic support is first reacted with the vapour of a non-metallocene transition metal compound and then with a metallocene compound of a transition metal, or wherein said solid inorganic support is first reacted with the vapour of a metallocene compound of a transition metal and then with a non-metallocene transition metal compound.

15. The process for polymerizing 1-olefin monomers according to claim 14, wherein in the process for preparing the heterogeneous catalyst said non-metallocene transition metal compound is $TiCl_4$.

16. The process for polymerizing 1-olefin monomers according to claim 2, wherein in the process for preparing the heterogeneous catalyst before or after treatment of said solid inorganic support with said vapourized metallocene compound, said solid inorganic support is treated with an activating agent.

17. The process for polymerizing 1-olefin monomers according to claim 16, wherein in the process for preparing the heterogeneous catalyst said activating agent is an organoaluminum compound.

18. The process for polymerizing 1-olefin monomers according to claim 17, wherein in the process for preparing the heterogeneous catalyst said organoaluminum compound is selected from the group consisting of TMA (trimethylaluminum), TEA (triethylaluminum), DEALOX (diethylaluminum ethoxide), TEB (triethylboron), TIBA (triisobutyaluminum), EADC (ethylaluminum dichloride), and MAO (methylaluminumoxane).

19. The process for polymerizing 1-olefin monomers according to claim 16, wherein in the process for preparing the heterogeneous catalyst said activating agent is an ionic compound having the formula V:

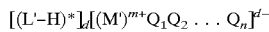   V wherein

L' is a neutral Lewis base;

H is a hydrogen atom;

[L'–H] is a Bronsted acid;

M' is a metal or metalloid selected from the group consisting of Group V-B, Group VI-B, Group VII-B, Group VIII, Group I-B, Group II-B, Group III-A, Group IV-A, and Group V-A;

each of $Q_1$ to $Q_n$ is independently selected from the group consisting of a hydride radical, a dialkylamido radical, an alkoxide radical, an aryloxide radical, a hydrocarbyl radical, a substituted hydrocarbyl radical, and an organometalloid radical, and any one, but no more than one, of $Q_1$ to $Q_n$ can be a halide radical, the remaining $Q_1$ to $Q_n$ being independently selected from the foregoing radicals;

m is an integer from 1 to 7;

n is an integer from 2 to 8; and n−m=d.

20. The process for polymerizing 1-olefin monomers according to claim 16, wherein in the process for preparing the heterogeneous catalyst said solid inorganic support is treated with a solution or vapour of said activating agent.

21. The process for polymerizing 1-olefin monomers according to claim 16, wherein in the process for preparing the heterogeneous catalyst said treatment with said activating agent is carried out before or after said treatment with said metallocene compound.

22. The process for polymerizing 1-olefin monomers according to claim 2, wherein the process for preparing the heterogeneous catalyst further comprises treating said solid inorganic support thermally or chemically to modify the number of active sites on the surface of said solid inorganic support prior to contact with said vapor of said metallocene compound.

23. The process for polymerizing 1-olefin monomers according to claim 2, wherein the process for preparing the heterogeneous catalyst further comprises preactivating said catalyst by contacting it with a polymerizable monomer under olefin polymerizing conditions for a period of time sufficient to form a prepolymerized metallocene-containing catalyst after said treatment with said metallocene compound.

* * * * *